US007580574B2

(12) United States Patent
Tobita et al.

(10) Patent No.: US 7,580,574 B2
(45) Date of Patent: Aug. 25, 2009

(54) USER INTERFACE METHOD AND APPARATUS, AND COMPUTER PROGRAM

(75) Inventors: Hiroaki Tobita, Tokyo (JP); Junichi Rekimoto, Tokyo (JP)

(73) Assignee: Sony Corporation (JP)

( * ) Notice: Subject to any disclaimer, the term of this patent is extended or adjusted under 35 U.S.C. 154(b) by 558 days.

(21) Appl. No.: 10/863,032

(22) Filed: Jun. 8, 2004

(65) Prior Publication Data

US 2005/0062740 A1 Mar. 24, 2005

(30) Foreign Application Priority Data

Jun. 12, 2003 (JP) .............................. 2003-168357

(51) Int. Cl.
*G06K 9/34* (2006.01)
*G06F 3/033* (2006.01)

(52) U.S. Cl. ...................................... 382/187; 345/179

(58) Field of Classification Search ................. 382/103, 382/181, 186, 190, 199, 203, 206, 209, 182–185, 382/187–189; 345/173–184

See application file for complete search history.

(56) References Cited

U.S. PATENT DOCUMENTS 5,596,656 A * 1/1997 Goldberg .................... 382/186

FOREIGN PATENT DOCUMENTS

| JP | 2002-024860 A | 1/2002 |
| JP | 2002-074399 A | 3/2002 |
| JP | 2003-256859 A | 9/2003 |
| JP | 2004-199130 A | 7/2004 |

OTHER PUBLICATIONS

Igarashi et al., "Teddy: A Sketching Interface for 3D Freeform Design", Computer Graphics Proceedings, Annual Conference Series, 1999, Proceedings of SIGGRAPH 99, Aug. 8-13, 1999, pp. 409-416.

Tobita et al., "Flat3D: A Shared Virtual 3D World System for Creative Activities and Communication", IPSJ Journal, vol. 44, No. 2, Feb. 2003, pp. 245-255.

"Image Retrieval System Based on Image Content," bit, vol. 31 No. 10 (Oct. 1, 1999) pp. 23-34.

"Hierarchical Model as the Framework for the Similar Image Retrieval System Construction," Institute of Electronics Information and Communication Engineers Technical Study Reports, vol. 97, No. 202 (Jul. 24, 1997), pp. 25-32.

"Visual Interface," Information Processing vol. 33, No. 2 (Feb. 15, 1992), pp. 128-133.

"Flat3D: Three Dimensional Common Virtual Space Systems Which Enable Creation and Communication," The Information Processing Society of Japan Article Magazine, vol. 44, No. 2 (Feb. 15, 2003) pp. 245-255.

Japanese Office Action issued on Jul. 28, 2008 in connection with corresponding Japanese Patent Application No. 2003-168357 (2 pages).

* cited by examiner

*Primary Examiner*—Aaron W Carter
(74) *Attorney, Agent, or Firm*—Lerner, David, Littenberg, Krumholz & Mentlik, LLP

(57) ABSTRACT

A user interface method includes acquiring a shape of an object arrangement area entered by a user's sketch operation; acquiring an object conversion parameter based on the acquired shape of the object arrangement area; acquiring a symbol entered by a user's sketch operation; searching registered objects for a display object associated with the acquired symbol; converting initial data of the display object to form a converted display object based on the object conversion parameter; and displaying the converted display object in the object arrangement area.

8 Claims, 20 Drawing Sheets

THE OBJECT IS OBTAINED BY DRAWING A SILHOUETTE AND A KANJI CHARACTER. THE NEXT CANDIDATE IS SET BY THE SELECTION GUI.

THE OBJECT IS CHANGED BY THE WAY THE SILHOUETTE IS DRAWN.

CONVERSION TO 3D DISPLAY BY WRITING A SQUARE ON AN OBJECT

COMBINATION WITH A KANJI CHARACTER REPRESENTING A COLOR

EXAMPLE OF CREATION USING TWO OBJECTS. A GUI IS OBTAINED BY A KANJI CHARACTER.

FIG. 8

//Overview of pseudo code
//
//------------------------------------------------------
//main.cpp-Windows main part
//
//Pseudo code of an example of application program coded under the
// following condition:
// Assumed OS:
//      Windows (Microsoft corporation US)
// Programming language:
//      C++
// Software libraries other than those of C++ (major libraries only):
//      Direct3d (API for three-dimensional image processing for
//      Direct X from Microsoft Corporation US)
//      Existing OCR (Optical Character Recognition) library
//      CDT method library
// User input:
//      Input is basically from mouse.
// Symbol to be processed:
//      Kanji character
//------------------------------------------------------

/* 1)The following pseudo code is provided only for the purpose of describing one embodiment of the present invention. It is understood that those skilled in the art could easily modify, change, or add functions to the pseudo code based on the description of the claims. It is to be construed that a part of those modifications included in the equivalent range of the present invention is also included in the claims. */

/* 2) In the following pseudo code, a part of code is rewritten or omitted as necessary for the purpose of function description. However, those skilled in the art could identify or define the necessary code from the specification, other drawings, or the function description included in the pseudo code in order toimplement the present invention. */

FIG. 9

//Definition of drawing object data
 /* Define structure composed of 3D positions and texture
 coordinates as new data type D3DTLVERTEX2 */
    typedef struct _D3DTLVERTEX2_ {
            float x,y,z;      // 3d position
            float tu,tv;      // texture coordinates
 } D3DTLVERTEX2;

/* Define drawing object data (D3DTLVERTEX2) as vector object
 cdttriangle)*/
    vector <D3DTLVERTEX2> cdtTriangle;

FIG. 10

```
//Application main method 1//
//Main//

//      ---------------------------------------------
//Neme: WinMain ()
//Desc: Windows application
//      ---------------------------------------------
int Main()
{
        Cteate Window ();//Create application Window//
        ocrInit();            //Initialize OCR library//
        if(SUCCEEDED(InitD3D())){     /*initialize Direct3D and pass
        control to the processing of if statement if Direct3D is initialized
        normally*/
                guiInit();//Initialize GUI  //
                while (1) {     /*Perform processing within while while
                                application is active*/
                        if(mouse or key event occurs)){
                                MsgProc();     /*processing for mouse
                                        or key event. see <Table 4>*/
                        }else{
                                BeginScene ();{ //Start of scene drawing//
                                        Render ();//Scene drawing//
                                }EndScene ();//End of scene drawing//
                        }
                }
                guiEnd ();         //End of GUI(GUI post-processing)//
        }
        EndD3D ();     //End of Direct3D//
        ocrEnd ();     //Termination processing for OCR(end of OCR
                        library)//
                Delete Window ();//Delete application window//
        return 0;
}
```

FIG. 11

```
//Application main method 2//
  //Processing when mouse event occurs//

//  -----------------------------------------
      //Name:MsgProc
      //Desc: Process mouse event
      //  -----------------------------------------
      void MsgProc()
      {
            switch(mouse event){
                        break;
                  case WM_LBUTTONDOWN:      //Mouse left button
                                            pressed//
                  case WM_RBUTTONDOWN:      //Mouse right button
                                            pressed//
                        if(GUI area){
                              setMouseState();//See <Table 4>//
                        }else{      //Work area//
                              SetCapture();      //Mouse event ON//
                        }
                        break;
                  case WM_RBUTTONUP:      //Mouse right button
                                          released//
                        ReleaseCapture();//Mouse event OFF//
                        break;
                  case WM_LBUTTONUP://Mouse left button
                                          released//
                        ReleaseCapture();//Mouse event OFF//
                        Joint stroke start point to end point;
                        break;
                  case WM_MBUTTONUP://Mouse middle button
                                          pressed//
                        SetCapture();//Mouse event ON//
                        break;
                  case WM_MBUTTONUP://Mouse middle button
                                          released//
                        ReleaseCapture();//Mouse event OFF//
                        break;
                  case WM_MOUSEMOVE://Mouse moved//
                        break;
                  default:
                        break;
            }
      }
```

FIG. 12A

```
//Application main method 3//
//Processing when mouse right button is pressed in GUI area//
    //   ------------------------------------------------
    //Name:setMouseState ()
    //Desc: Mouse event
    //   ------------------------------------------------ setMouseState(int event_status,int draw_type,UINT msg)
    {
        pstate=mstate;
        mstate=event_status;

switch(event_status){
        case ARROW_LEFT;        //Display next candidate
                                (backward direction) registered
                                with DB//
            setNexPic();        //See <Table 6>//
            break;
        case ARROW_RIGHT;    //Display next candidate
                                (forward direction) registered with
                                DB//
            setNexPic();//See <Table 6>//
            break;
        case CHANGE_GUI; //If Change GUI selection operation
                                performed//
            ocrGetWord (category,ptTexture); //OCR processing//
            if (character cannot be identified){
                clearCanv (); //Initialize drawing area//
                break;
            }
            switch(classify by category){      //Kanji character,
                                numeric, or alphabetic//
            case KANJI_FIGURE: //If Handwritten Kanji
                                character identified//
                cdtTriangle.clear (); /*initialize storage data
                        length of container variable cdtTriangle*/
                basedOnTemplate (); //Build model data. See
                        <Table 7>//
                clercCanv (); //Initialize drawing template//
                break;
            }
            break;
        case PEN_GUI: //If Pen GUI component selection
                                operation performed//
            Processing for stroke input via mouse operation;
        case TEXT_GUI: //If TEXT GUI component
                        selection operation performed//
```

FIG. 12B

Generation of text input area via mouse operation;
Text input processing via keyboard operation;

```
case ERASE_GUI: //If Erase GUI component selection
                        operation performed//
    Processing for object selection via mouse
    operation;
    Initialization processing for selected object;
    break;
default:
    }
}
```

FIG. 13

//Application main method 4//

//Processing when mouse right button is pressed in
//GUI area when ARROW_LEFT or ARROW_RIGHT is selected

```
//    ------------------------------------------
//Name:setNextPic ()
//Desc: Display next object based on stroke
//    ------------------------------------------
void setNextPic () {
    if(ARROW_RIGHT) {
        Move into forward direction;
    } else if(ARROW_LEFT) {
        Move into backward direction;
    }
    basedOnTemplate();//Build model data. See <Table 7>//
}
```

//processing when mouse right button is pressed in
//GUI area when ARROW_LEFT or ARROW_RIGHT of object is selected

```
//    ------------------------------------------
//Name:Render ()
//Desc: Draw polygon
//    ------------------------------------------
void Render(LPDIRECT3DDEVICE8 1pD3DDEV)
{
    //Clear screen
    1pD3DDEV->Clear(0,NULL,D3DCLEAR_TARGET
D3DCLEAR_ZBUFFER,D3DCOLR_XRGB(0x0,0x0,0x0)1.0f,0);
    if(GetCapture()) {    //If Mouse clicked//
        modelPick(mouse position); /*Calculate what
            position on paint surface the mouse position
            clicks and perform drawing in bitmap*/
    }
    setGUI(1pD3DDEV) ; //Draw GUI based on
                    Direct3D device object// if(there is an object)){
        //Draw patch of calculation result;
    } else{
        //Draw drawing plate;
    }
}
```

FIG. 14A

```
//Application main method 5//
//Method for generating drawing objects (silhouette object, display
//object) from user-entered stroke //  ----------------------------------------------
    //Name: basedOnTemplate()
    //Desc: Normalize stroke and convert it to circle composed of
    //the same number of vertexes.  Reflect conversion result on
    //silhouette data of kanji character compatible object and build
    //model data
    //  ----------------------------------------------
    void basedOnTemplate() { vector<D3DTLVERTEX2>bEdge,stroke;
        float sum;

Obtain template data;//Obtain template corresponding to
        stroke from DB//
        getEdgeData(bEdge);        //Get data bEdge on the points
                                    from template data//

//Calculate No. of templates and distance//
    for(int=0; i<bEdge.size()-1 ; i++){
            float diffx=bEdge [i].x - bEdge[i+1].x;
            float diffx=bEdge [i].y - bEdge[i+1].y;
            float rate=fabs(diffx)+fabs(diffy);
            sum+=rate;        ratio.push_back(rate);
    }
//Calculate distance ratio//
    for(i=0; i<ratio.size() ; i++){    ratio[i] /=sum;  }

//Normalize stroke data//
    stroke=normalizeByRate (ratio);

//Calculate circumscribed quadrangle of stroke//
    float verLeft= (float) strokeRect.left / RECT_SCALE;
    float verTop= (float) strokeRect.top / RECT_SCALE;
    float verWidth=(float)(strokeRect.right-strokeRect.left) /RECT_SCALE;
    float verHeight=(float)(strokeRect.bottom-strokeRect.top) / RECT_SCALE;
    float verCentx=verLeft+(verWidth / 2);
    float verCenty=verTop+(verHeight / 2);
```

FIG. 14B

```
//Calculate aspect ratio of circumscribed quadrangle of stroke//
float aspect=verWidth / verHeight;
    if(aspect<=1.0f)
            radius=verHeight / 2;       //Adjust width in relation to
                                            height//
    else
            radius=verWidth / 2;        //Adjust height in relation to
                                            width//

//Calculate x,y for changing stroke to circle//
    if(aspect<=1.0f){       //If Portrait layont//
            setData(Fix y)
    }else{                  //If Landscape layont//
            setData(Fix x)
    }
    /*Substitute into triangle and segment inside of closed
    curve into multiple triangles.  Triangle uses restricted
    Delaunay triangle division (CDT) library to change stroke
    into patch form (fill inside of stroke with patches).  For
    Triangle, see http://www-2.cs.cmu.edu/~quake/triangle.
    html.  The contents of this prior art are incorporated
    herein by reference.*/ for(i=1; i<=maxmax[0];i++){
        for (int j=0;j<3;j++){
                cdtTriangle.push_back(lastpt[index[i]][j]-1]);
        }
    }       //substitute into drawing list//
}
```

FIG. 15A

```
//Other methods 1//
//Application Window-related method

//   ------------------------------------------------
    //Name: Create Window ()
    //Desc: Initialize application Window
    //   ------------------------------------------------
    Create Window () {
            Initialization processing for application Window;
    }

//   ------------------------------------------------
    //Name: Delete Window ()
    //Desc: Delete application Window
    //   ------------------------------------------------
    Delete Window () {
            Delete processing for application Window;
    }

//Direct3D related method

//   ------------------------------------------------
    //Name: InitD3D ()
    //Desc:Initialize Direct3D
    //   ------------------------------------------------
      InitD3D () {
            Initialization processing for Direct3D;
    }

//   ------------------------------------------------
    //Name: EndD3D ()
    //Desc: End Direct3D
    //   ------------------------------------------------
      EndD3D () {
            End processing for Direct3D;
    }

//OCR related method

//   ------------------------------------------------
    //Name: ocrInit ()
    //Desc: Initialize OCR library
    //   ------------------------------------------------
      ocrInit () {
            Initialization processing for OCR library;
    }
```

FIG. 15B

```
//      ------------------------------------------------
//Name: ocrEnd ()
//Desc: End OCR library
//      ------------------------------------------------
  ocrEnd () {
       End processing for OCR library;
}

//      ------------------------------------------------
//Name: ocrGetWord ()
//Desc: Recognize character via OCR library
//      Reference OCR library from image data(texture) to
//      identify character.  The category is divided into kanji
//      character, numeric character, and alphabetic character.
//      ------------------------------------------------
  int ocrGetWord (category,Texture) //OCR processing
{
       processing of referencing ocr library from image data
       (Texture) to identify character;
       return  identification character;
}
```

FIG. 16

```
//Other methods 2//
 //GUI related methods//
        //  ------------------------------------------------
        //Name: guiInit ()
        //Desc: Initialize GUI
        //  ------------------------------------------------
          guiInit () {
                GUI initialization processing;
          }

//  ------------------------------------------------
        //Name: guiEnd ()
        //Desc: End GUI
        //  ------------------------------------------------
          guiEnd () {
                GUI end processing;
          }

//  ------------------------------------------------
        //Name: setGUI ()
        //Desc: Draw GUI
        //  ------------------------------------------------
          setGUI () {
                GUI drawing processing;
          }
 //Mouse event related method
        //  ------------------------------------------------
        //Name: SetCapture ()
        //Desc: Mouse event ON
        //  ------------------------------------------------
          SetCapture () {
                Mouse event ON;
          }

//  ------------------------------------------------
        //Name: ReleaseCapture ()
        //Desc: Mouse event OFF
        //  ------------------------------------------------
          ReleaseCapture () {
                Mouse event OFF;
          }

//  ------------------------------------------------
        //Name: GetCapture ()
        //Desc: Retrieve mouse event
        //  ------------------------------------------------
          GetCapture () {
                Mouse event retrieval processing;
          }
```

FIG. 17A

//Other methods 3//

//Model data building related method//

```
//    ------------------------------------------------------
//Name: setData ()
//Desc: Find x and y with the radius of circle as the stroke
//      height if portrait layont
//    ------------------------------------------------------
   setData () {
       if (Fix y)
              x=sqrt(radius*radius-y*y)    //Square root of square
                                           of radius minus square of y//
       else //Fix x//
              y=sqrt(radius*radius-x*x)    //Square root of square
                                           of radius minus square of x//
   }

//    ------------------------------------------------------
//Name: normalizeByRate (ratio)
//Desc: Normalize stroke based on ratio
//The sum of stroke length and the sum of template length are
//both set to 1. The start point of both is a point where y is
//smallest. The stroke is scanned for the length of template.
//      Example: if template is 0.1, 0.15, 0.1, ...and if stroke is
//      0.05, 0.06, 0.1 ..., then the ratio is calculated as (0.05+
//      0.06-0.1)/0.06 when 0.05+0.06>0.1 for the stroke, and
//      the line 0.06 is divided for normalizing the stroke.
//    ------------------------------------------------------
normalizeByRate(float ratio){
       Processing for normalizing stroke data based on ratio;
}

//    ------------------------------------------------------
//Name: CDT_patch ()
//Desc: Library for filling the inside of stroke with patches
//    ------------------------------------------------------
CDT_patch(){
       Processing for filling the inside of stroke with patches
       using cdt method library;
}
```

FIG. 17B

//Drawing related method//

```
//    ----------------------------------------------
//Name: modelPick ()
//Desc: Calculate what position on the paint surface the mouse
//position clicks
//    ----------------------------------------------
modelPick(mouse position)
{
        Calculate what position on the paint surface the mouse
        position clicks;drawbutmap ();     //Drawing in bitmap//
}

//    ----------------------------------------------
//Name: drawBitmap ()
//Desc: Draw in bitmap
//    ----------------------------------------------
drawBitmap ()
        Drawing processing for bitmap
}

//    ----------------------------------------------
//Name: clearCanv ()
//Desc: Clear drawing surface
//    ----------------------------------------------
void clearCanv ()
        Processing for clearing drawing surface;
}
```

USER INTERFACE METHOD AND APPARATUS, AND COMPUTER PROGRAM

CROSS REFERENCE TO RELATED APPLICATIONS

The present application claims priority from Japanese Application No. 2003-168357 filed on Jun. 12, 2003, the disclosure of which is hereby incorporated by reference herein.

BACKGROUND OF THE INVENTION

The present invention relates to a user interface method and device, and a computer program.

Many sketch interfaces are available that allow the user to perform interaction in the three-dimensional space through a two-dimensional operation. For example, see Teddy in Igarashi, T., Satoshi, M., Hidehiko, T., "Teddy: A Sketching Interface for 3D Freeform Design", in Proc. of SIGGRAPH 99, 409-416, 1999, and Flat3D in Hiroaki Tobita, Junichi Rekimoto, "Flat3D: A Shared Virtual 3D World System for Creative Activities and Communication", IPSJ JOURNAL, Vol. 44, No. 02, 2003. The operation of such sketch interface systems is simple because the user can perform all operations in three dimensions in exactly the same manner as the user performs operations in two dimensions. On the other hand, it is sometimes difficult to simply acquire an object with exact fidelity to the design image because the result of drawing work depends largely on the user's design skill.

Another method for building a scene is by describing the parameters (shape, position, size, color, etc.) of an object in the two- or three-dimensional space as a script. For example, see the Maya™ Mel script in Alias|wavefront company homepage http://www.aliaswavefront.com/en/news/home-.shtml. The scene building method using a script like this allows the user to build a scene as if the user wrote a sentence but requires the user to describe a script using an editor. This prevents the user from interacting directly with the three-dimensional space. In addition, because the user must memorize the operation/behavior of the syntax rules and functions for describing a script in order to acquire an intended scene or object, many users cannot perform the operation easily.

SUMMARY OF THE INVENTION

In view of the above-described issues relating to the related art, an embodiment of the present invention provides a user interface method that is intuitive and easy to operate and that allows the user to easily acquire an object with higher fidelity to a design image. According to another embodiment of the present invention, there is provided a user interface method that allows the user to easily generate an object with fidelity to a design image when the user interacts in a three-dimensional space through a two-dimensional operation. According to still another embodiment of the present invention, there is provided a user interface method that uses text-based symbols, such as characters, character strings, and sentences, but allows the user to perform intuitive interactions in the three-dimensional space using the meaning of the symbols. Still other objects of the present invention will become apparent by the drawings and the description given below.

A user interface method and apparatus and a computer program according to an embodiment of the present invention use the configurations described below. According to the invention, a shape of an object arrangement area entered by a user's sketch operation is acquired, and an object conversion parameter is acquired based on the acquired shape of the object arrangement area. In addition, a symbol entered by a user's sketch operation is acquired, and registered objects for a display object associated with the acquired symbol are searched. The initial data of the display object is converted to form a converted display object based on the object conversion parameter, and the converted display object is displayed in the object arrangement area.

In such configurations, the user can specify an object arrangement area through an intuitive operation, called a sketch operation, to perform various operations on a display object. In addition, in such configurations, the user can specify a symbol through an intuitive operation, called a sketch operation, to easily call a registered display object related to the symbol. The designation of an object arrangement area can be performed by a simple operation, for example, by drawing a closed curve, and the designation of a symbol through sketching can be performed based on a user-familiar operation in which the user writes a character on a paper. Therefore, the configurations described above can provide a design tool that does not depend largely on the user's design skill and that is easy and intuitive.

The sketch operation may be performed by various pointing means such as a mouse, a track ball, a tablet device, a gesture input system, or an optical pointing system. During the sketch operation, the system can help the user through appropriate processing such as point interpolation and smoothing. The registered objects may be updated by an appropriate method. This update may be performed, for example, by newly acquiring an object as necessary from a picture or a user sketch, assigning an appropriate symbol to the object, and registering it with a predetermined resource, such as a database, or by rewriting initial data on an object associated with a symbol or rewriting pointer information pointing to the initial data.

According to an embodiment of the present invention, the initial data can include initial shape data of the display object, and the conversion can include changing the shape of the display object from the initial shape. The conversion of the initial data on the display object may include not only changing the shape, but also various visual conversions such as converting the brightness, converting the colors, converting the shading in color, or changing the patterns. In addition, if conversion parameters are set so that other modules in the same application or other applications can reference them, not only can a visual effect be added to the display object, but also other various applications can be made. For example, a visual effect (for example, the conversion of peripheral objects, etc) in an area outside the object arrangement area or an audio effect (for example, the generation of a sound effect) associated with the display object can be generated.

In addition, according to an embodiment of the present invention, it is possible to use a configuration in which the object arrangement area has an initial set shape, and the object conversion parameter is acquired based on a comparison between the initial set shape and the acquired shape of the object arrangement area.

According to an embodiment of the present invention, it is possible to use a configuration in which the initial set shape of the object arrangement area is three-dimensional and the acquired shape of the object arrangement area is two-dimensional. In one variant, the initial set shape is converted into a two-dimensional projection, and the object conversion parameter is acquired based on a comparison between the two-dimensional projection of the initial set shape and the acquired shape of the object arrangement area. In another variant, the acquired shape of the object arrangement area is extended into three dimensions, and the object conversion parameter is acquired based on a comparison between the acquired shape of the object arrangement area extended into three dimensions and the initial set shape of the object arrangement area. This configuration provides the user with the ability to specify the object arrangement area through a two-dimensional operation and to perform an intuitive interaction with a three-dimensional space.

Furthermore, according to an embodiment of the present invention, it is also possible to use a configuration in which the symbol is a character, a character string, or a sentence and the display object associated with the symbol is an image object related to a meaning of the symbol. Such a configuration enables the user to acquire an image object easily through a character even if the user is not familiar with the syntax or the semantics of the script language. In other words, it can be said that the meaning of the character is presented to the user through the display object. In this case, when the user enters as a symbol a character, a word, or a phrase, etc. whose meaning is unknown, the user can recognize its meaning as an image that is adapted to the user-specified arrangement area shape.

According to an embodiment of the present invention, there is provided a user interface method that allows the user to perform operations intuitively and easily and to acquire an object which is close to a design image relatively easily. In addition, according to an embodiment of the present invention, there is provided a user interface method that allows the user to generate an object which is close to a design image when the user performs interactions for a three-dimensional space via two-dimensional operations. In addition, according to an embodiment of the present invention, there is provided a user interface method in which the user, who uses a text-based symbol such as a character, a character string, or a sentence, can interact with the three-dimensional space intuitively through the meaning of the symbol.

In addition, according to an embodiment of the present invention, it is possible to provide a very useful education tool, especially a tool for character education or word education. For example, the shape of a kanji character is derived, in many cases, from the shape associated with a behavior in the real world and therefore the direct association between a kanji character and an object such as an image helps us understand the meaning and the shape. Therefore, this method in which kanji characters are directly associated with objects, is considered efficient in kanji character education for children and in Japanese education for foreigners. When teaching words to infants or non-native learners, the ability to show a word as well as its corresponding image would attract the learner's interest and achieve a high learning effect.

In addition, the acquisition of a display object according to an embodiment of the present invention can be used not only for conversion, but also as a trigger for drawing. Painting an object, with a converted object as the base, has the function of a trigger for creation.

A display object according to an embodiment of the present invention, which can be created based on a simple data configuration, can be used as a new communication tool attached to e-mail, etc. That is, because data can be a drawing in a bit map, the drawing can be sent via e-mail. A display object is also useful when a handwritten character is input to a computer, such as a PDA, that supports pen input. In addition, because an object can be generated by drawing a kanji character in a shared virtual space communication and its size is small, a display object is useful in communications via a network.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 8 is an example of an overview of pseudo code;

FIG. 9 is an example of definition of drawing object data;

FIG. 10 is an example of an application main method 1;

FIG. 11 is an example of an application main method 2;

FIGS. 12A and 12B depict an example of an application main method 3;

FIG. 13 is an example of an application main method 4;

FIGS. 14A and 14B depict an example of an application main method 5;

FIGS. 15A and 15B depict an example of other methods 1;

FIG. 16 is an example of other methods 2; and

FIGS. 17A and 17B depict an example of other methods 3.

DETAILED DESCRIPTION

System Overview

First, an overview of an example of a system in accordance with the present invention will be described briefly. This system example allows the user to acquire an image object through handwriting input. In this example, the user basically draws a silhouette (contour/line/outline/silhouette) and draws a kanji character in an appropriate area to generate an object related to the character in the silhouette.

The basic processing flow of this example is as follows:
1. A user draws a silhouette (for example, a closed curve).
2. The system displays the silhouette.
3. The user enters a kanji character in an appropriate drawing area (for example, inside the closed curve).
4. The system holds the size/shape data of the silhouette (usable for conversion parameters based on a comparison with a template) and the recognition result of the character.
5. The system references the database based on the recognition result of the character and selects a display object corresponding to the character.
6. The system shapes the display object in accordance with the shape of the silhouette.
7. The system displays the display object within the silhouette.

Example of Screen Image

Figure 5:
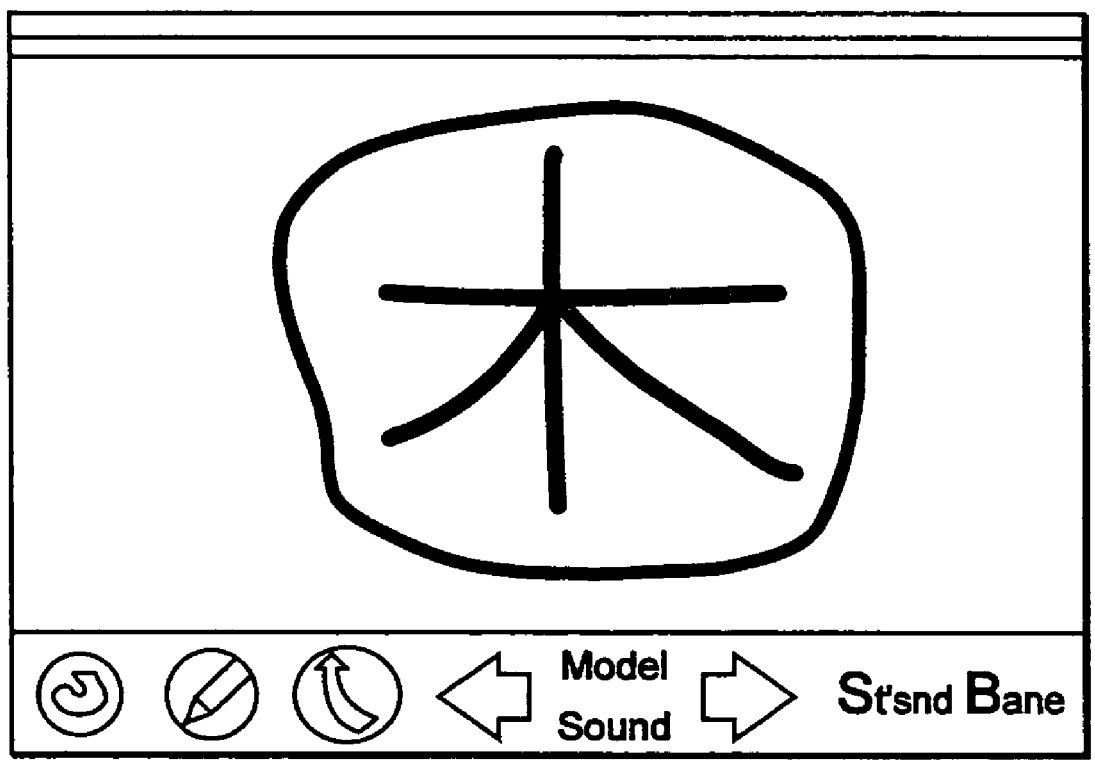
FIG. 5 is a display image in a system according to an embodiment of the present invention.
Figure 6A:
FIGS. 6A and 6B are display images of basic conversion in the system according to an embodiment of the present invention.
Figure 6B:
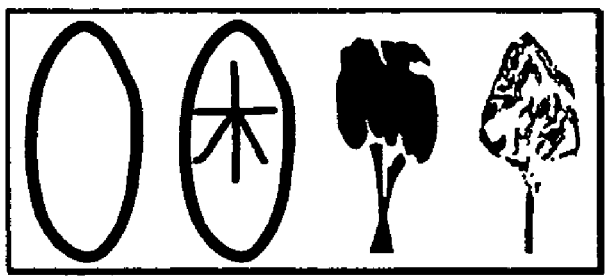
Figure 7A:
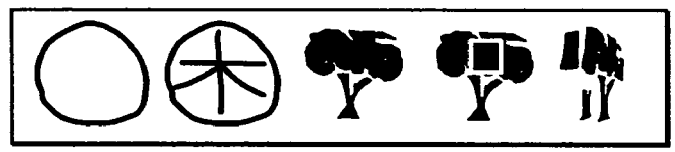
FIGS. 7A-7C are display images of applied conversion in the system according to an embodiment of the present invention.
Figure 7B:
Figure 7C:

Using FIG. 5 to FIG. 7, an example of a display image in this system will be shown. In the example in FIG. 5, the input side interaction from the user to the system is performed basically by the selection of a GUI and the drawing of a silhouette and a kanji character. Therefore, the interaction is performed based on the operation of a mouse, for example, in a hardware configuration in which a standard PC (Personal Computer) and a monitor are combined. By combining the system with a system that supports pen input or finger input, such as a tablet PC, a PDA, or a wall-type real-world-oriented interface, the system can provide the user with a more natural operation.

In the example in FIG. 5, the user performs operations for the system through GUI (Graphical User Interface) component selection and stroke drawing. In this example, the display area is divided roughly into a GUI component part and a drawing part.

An example of the GUI component part, shown at the bottom of FIG. 5, includes GUI components for mode selection and so on. The GUI components for mode selection include, for example, a silhouette input GUI component, a symbol input GUI component, a change GUI component, a pen GUI component, a text GUI component, an erasure GUI component, or a selection object change GUI component. Those GUI components either may be displayed in the format shown in FIG. 5 or prepared in the system as other selection-type GUI objects such as a radio button, a checkbox, or a pull-down menu. Today, a user or a system developer can easily change the correspondence between the GUI components and the corresponding functions. Therefore, the correspondence between the GUI components and the related functions is not described in FIG. 5. It should be understood that a necessary function that will be used can be related to a GUI component.

An example of the drawing part is shown in the center of FIG. 5.

The system proceeds to the silhouette drawing mode, for example, when the user selects the silhouette GUI component in the example in FIG. 5. In this mode, the user can draw a silhouette in the workspace. This drawing result is held in the system as a list of three-dimensional position information. The list information should be treated as a storage object (an object to be held by the system) only when a closed curve is drawn. In addition, the system enters the kanji character drawing mode, for example, when the user selects the kanji GUI component after drawing a silhouette. In this mode, the user can directly or indirectly draw (handwrite) a kanji character, for example, within a silhouette. The drawn kanji character is held by the system as image data on the screen.

After that, when the user presses the set GUI component, processing is performed for two types of data: the list data holding the position information and the image data holding the kanji character drawing information. For example, a stroke list, which is a data set that allows the application drawing module to draw a closed curve, is passed to the Triangular function to segment the inside of the closed curve into pieces based on a plurality of triangles. The image data is passed to the OCR (Optical Character Recognition) library for character recognition. The database is referenced based on the result of character recognition to determine the object, and this object is applied to the silhouette to complete the conversion from the kanji character to the object.

In this system example, conversion to an object is also possible in some cases, not via a silhouette, but from a drawn kanji character only. Conversion is also possible from only a drawn kanji character by treating the outline of a kanji character in the same manner a silhouette is processed. In addition, instead of providing selection GUI components, a system may also be built in which the mode can be changed by some other methods, for example, by acquiring an object from a drawn stroke only.

In this system example, if the user selects the kanji character GUI component and then draws "木", the model of a tree appears in the silhouette as shown in FIG. 6. For example, by building the system so that another object candidate can be applied to the character by performing a selection operation (for example, press) for the change GUI, the user can easily acquire an object that suits the user's application more precisely. It is also possible to directly convert the shape of an object by changing the way the character is drawn. Because a plurality of objects are stored for the same kanji character in the database in advance, the user can select from those candidates through the GUI operation. As a result, the user can acquire an object in three processes: silhouette drawing, kanji character drawing, and selection. Therefore, this system is characterized in that the user can use the system without special training because the system is based on kanji characters and so on with which the user is already familiar and which are used in writing sentences in daily life.

With this system example, the user can generate a more complex object by using a combination as shown in FIG. 7. Drawing a kanji character on an object, which is acquired from a silhouette and a drawn kanji character, generates a complex object. For example, writing "木" in the silhouette to acquire a tree object and then writing "赤" on the tree object generates a red tree object. Also possible is an interaction method that enables the objects to have a relationship between them. Setting a clock object, which is acquired from a silhouette and the drawn kanji character "時", next to the tree object can change the status of the tree by operating the clock.

This system is designed for various materials. For example, conversion not only to a model but also to a sound (laugh, anger, cry), as well as application to various contents such as an animation character (fly, run, walk), is also possible. Objects can be easily added to this system by updating the database of the templates.

Functional Modules

Figure 1:
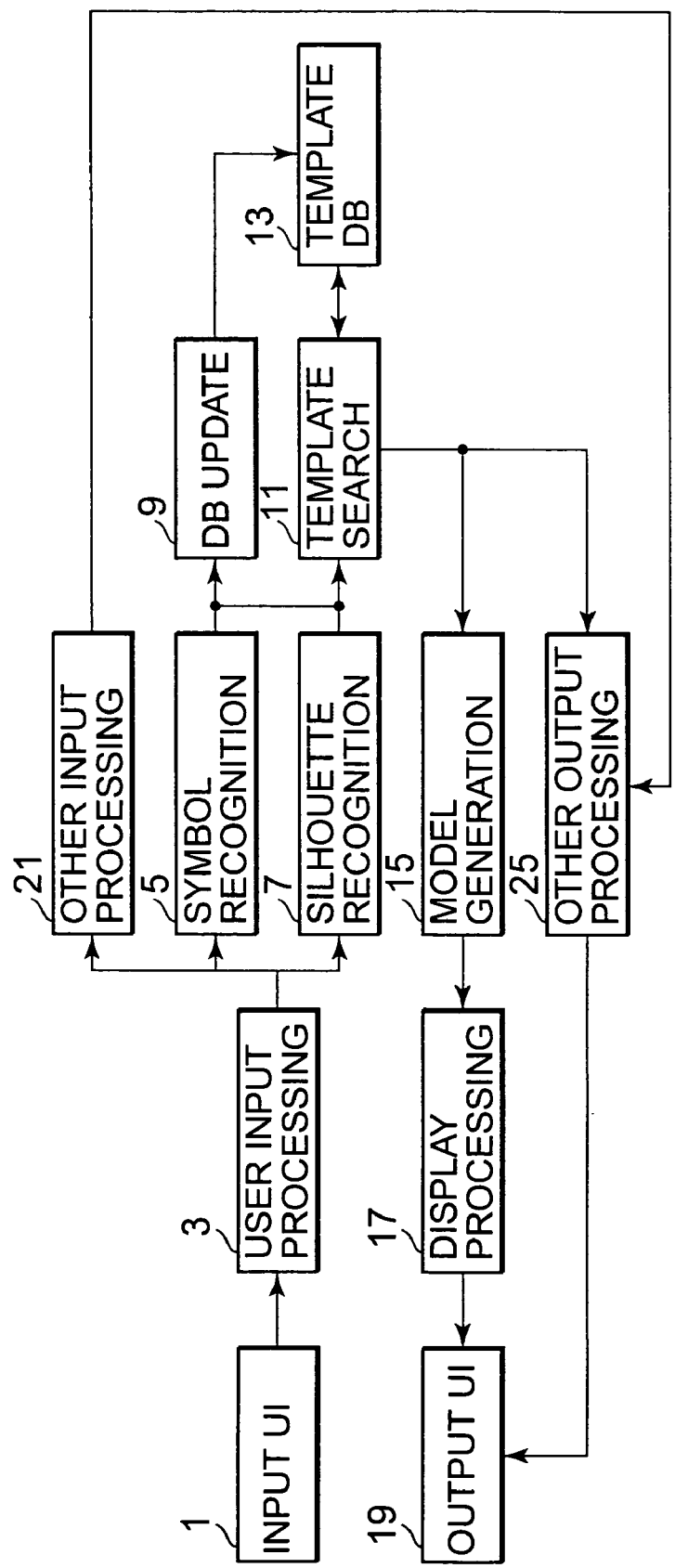
FIG. 1 is a general block diagram showing one embodiment of functional modules of a user interface apparatus according to an embodiment of the present invention.

FIG. 1 is a block diagram showing an embodiment of the functional modules of a user interface apparatus in the embodiment. For convenience, FIG. 1 shows only a very simplified image. In the actual implementation of this embodiment, the functions of these functional modules are allocated as necessary to hardware components and software components. Consequently, it is highly possible that the overview of an actual implementation will not be the same as that shown in FIG. 1. Also, modifications, corrections, additions, functional extensions and so on may be added to the functional modules.

An input user interface 1 in FIG. 1, composed of user input devices such as a keyboard, a mouse, or a tablet input unit, has an IF function that transfers data from the user input devices to a user input processing module 3. In this embodiment, it is preferable that the input user interface 1 be equipped at least with a user input device which allows the user to perform a sketch operation. Of course, a variety of input modes are also possible by using a configuration, for example, a multi-modal input mode configuration, in which multiple input means or multiple types of input means are provided.

The user input processing module 3 interprets a user operation entered via the input user interface 1 and sends commands and data to a symbol recognition module 5, a silhouette recognition module 7, or other internal input processing module 21 in the subsequent stage so that processing for the user operation is performed. In this embodiment, it is preferable that the user input processing module 3 be capable of recognizing at least a silhouette input and a symbol input from a user's sketch operation. Such a configuration can be implemented by making a conditional judgment using GUI component selection information or user input stroke information as the key. In this case, a symbol may take various forms, for example, characters such as a kana character, a katakana character, a kanji character, a hangul character, an Arabic alphabet, and an alphabet character; symbol characters such as a space, a comma, a period, an at mark, and a face mark; graphics; illustrations; and a combination of those characters such as a character string. When a character is used as the symbol, any character code such as ASCII and Unicode may be used. A silhouette is an object that is the base of a model that is displayed in such a way that the model graphic corresponding to a symbol is displayed with some relation to the symbol. For example, a silhouette is a display area in which the model graphic corresponding to a symbol is displayed. In this embodiment, it is preferable that both a symbol and a silhouette can be input by the user easily through a switch operation rather than require the user to have a sophisticated design skill.

The symbol recognition module 5 recognizes a symbol sketch-entered by the user based on data on the input symbol received from the user input processing module 3. This module is implemented by using, for example, the character recognition function of an OCR or Graffiti of Palm OS® (Palm, Inc.). The silhouette recognition module 7 recognizes the shape and other features of a silhouette sketch-entered by the user based on data on the silhouette entered from the user input processing module 3. It is desirable that the accuracy of symbol recognition and silhouette recognition be maintained by using appropriate processing such as data integration, calibration, and interpolation.

A template search module 11 searches a template database 13 for a corresponding template in response to the recognition result from the symbol recognition module 5 or the silhouette recognition module 7 (hereinafter, the database is abbreviated "DB"). The search result is sent to a model generation module 15. A DB update module 9 adds, changes, deletes, or rewrites template data or the correspondence between a symbol and a silhouette and updates the registration information in the template DB 13. To update the DB by the DB update module 9, a configuration created automatically based on a predetermined rule, a configuration created manually based on a user's predetermined instruction, or a configuration created by appropriately combining those configurations may be used. Although FIG. 1 shows that the DB is updated by the DB update module 9 based on data from the symbol recognition module 5 or the silhouette recognition module 7, this embodiment is not limited to this configuration. It is, of course, possible to update the DB based on data input from the other input processing module 21.

The template database 13, in which template data on display objects is stored, has a configuration in which symbol data, such as a recognized character, can at least be used to search for the template of a corresponding display object via the template search module 11. In some cases, the template database 13 may be configured in such a way that the template data on a silhouette is stored. The template database 13 can be implemented easily by configuring it so that symbol data and a corresponding template are included in the same entry or by configuring it so that a corresponding template can be searched for from symbol data via one or more identification information units (ID number, pointer, URL, etc.). Data in the database can be recorded in a non-distributed manner in the local resource of an apparatus connected to a network or a standalone apparatus or in a distributed manner in a network including a plurality of apparatuses.

Templates registered with the template database 13 may be three-dimensional data. Using this configuration allows a three-dimensional model to be generated easily from a two-dimensional sketch input by the user. That is, in such a configuration a sketch interface can be provided that makes it easy to interact with three-dimensional space. In addition, the user input processing module 3, the symbol recognition module 5, and the silhouette recognition module 7 can have a function of extending two-dimensional data into three dimensions. For the function of extending two-dimensional data into three dimensions, the invention described in Japanese Patent Laid-Open Publication No. 2002-024860, Japanese Patent Laid-Open Publication No. 2002-074399, Japanese Patent Application No. 2002-000945, or Japanese Patent Application No. 2002-363493, naming the inventor of the present invention and his colleagues as inventors, may be used. The contents of those patent documents are incorporated herein by reference.

In response to template data from the template search module 11, the model generation module 15 converts the acquired template appropriately and generates a model of a display object corresponding to the silhouette or the input symbol. This system is configured such that a conversion result created for at least one silhouette is reflected on the corresponding display object of an input symbol displayed in connection with the silhouette.

A display processing module 17 creates data, displayable on a display and so on included in an output user interface 19, from a model and so on generated by the model generation module 15. When three-dimensional data is used for a template as described above, the display processing module 17 converts three-dimensional data to two-dimensional data, for example, through rendering processing. The output user interface 19 includes output devices, such as a display unit, an audio output unit, and a tactile output unit. The configuration of the output user interface 19 is well known and its description is omitted.

In FIG. 1, the other input processing module 21 and an other output processing module 25 are functional modules that perform processing other than the processing described above. For example, the other output processing module 25 can generate voice output data corresponding to a generated model, and the other input processing module 21 can process a user input other than a symbol input or a silhouette input and execute appropriate internal processing.

Example of Processing Flow

Figure 2:
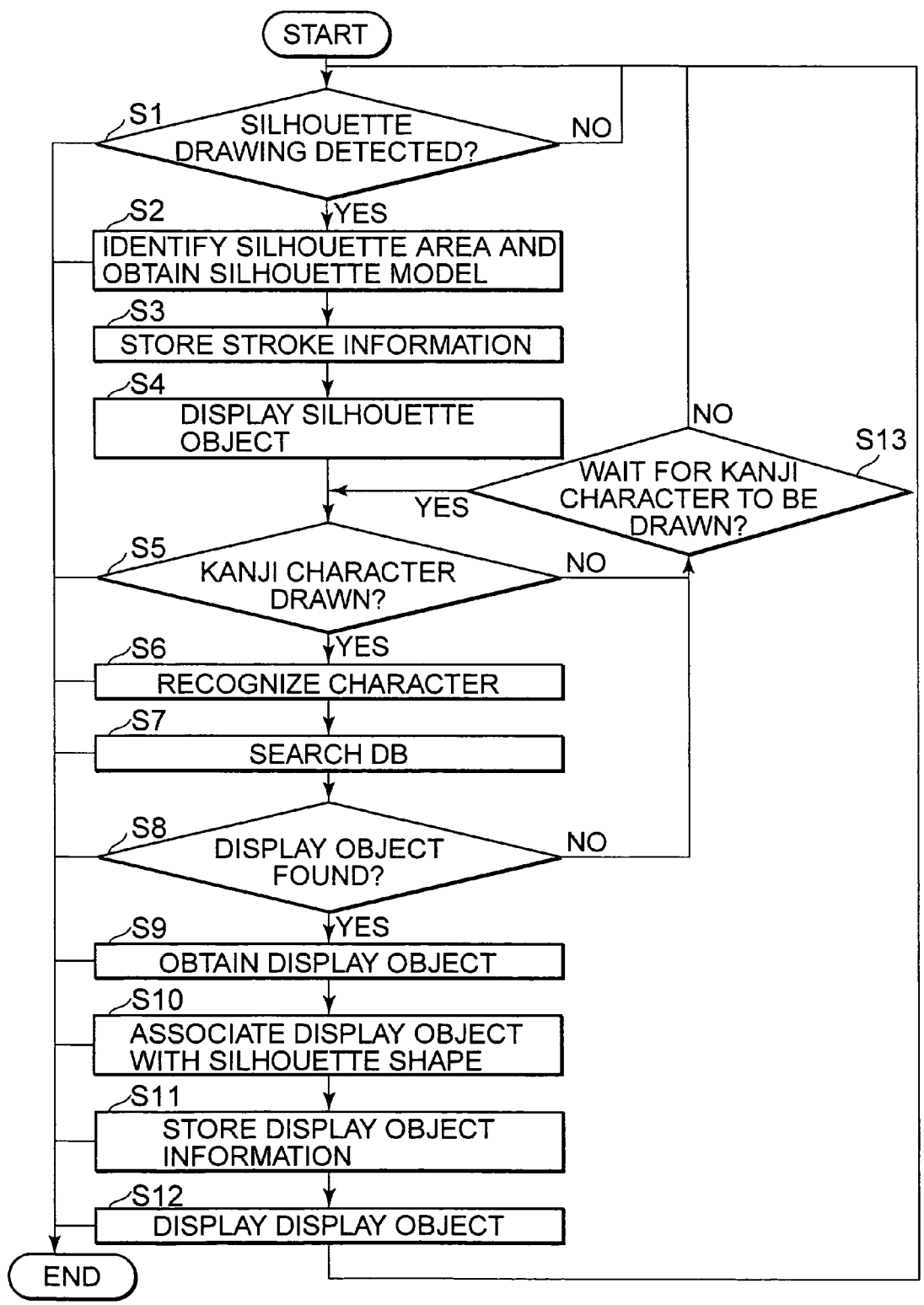
FIG. 2 is a flowchart showing the typical processing flow of a user interface method according to an embodiment of the present invention.
Figure 3:
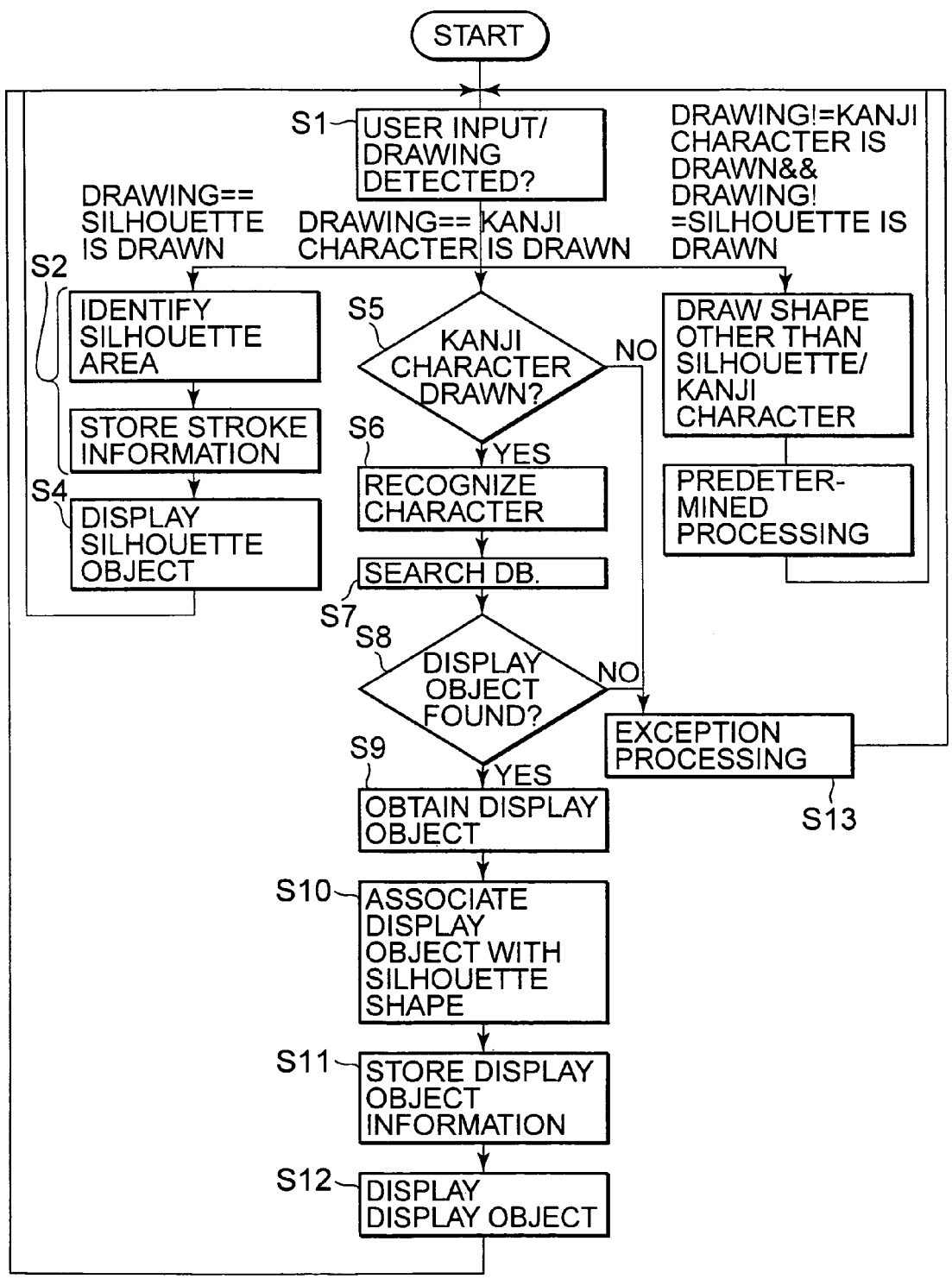
FIG. 3 is a flowchart showing the user interface method according to an embodiment of the present invention with the focus on a user input event.
Figure 4:
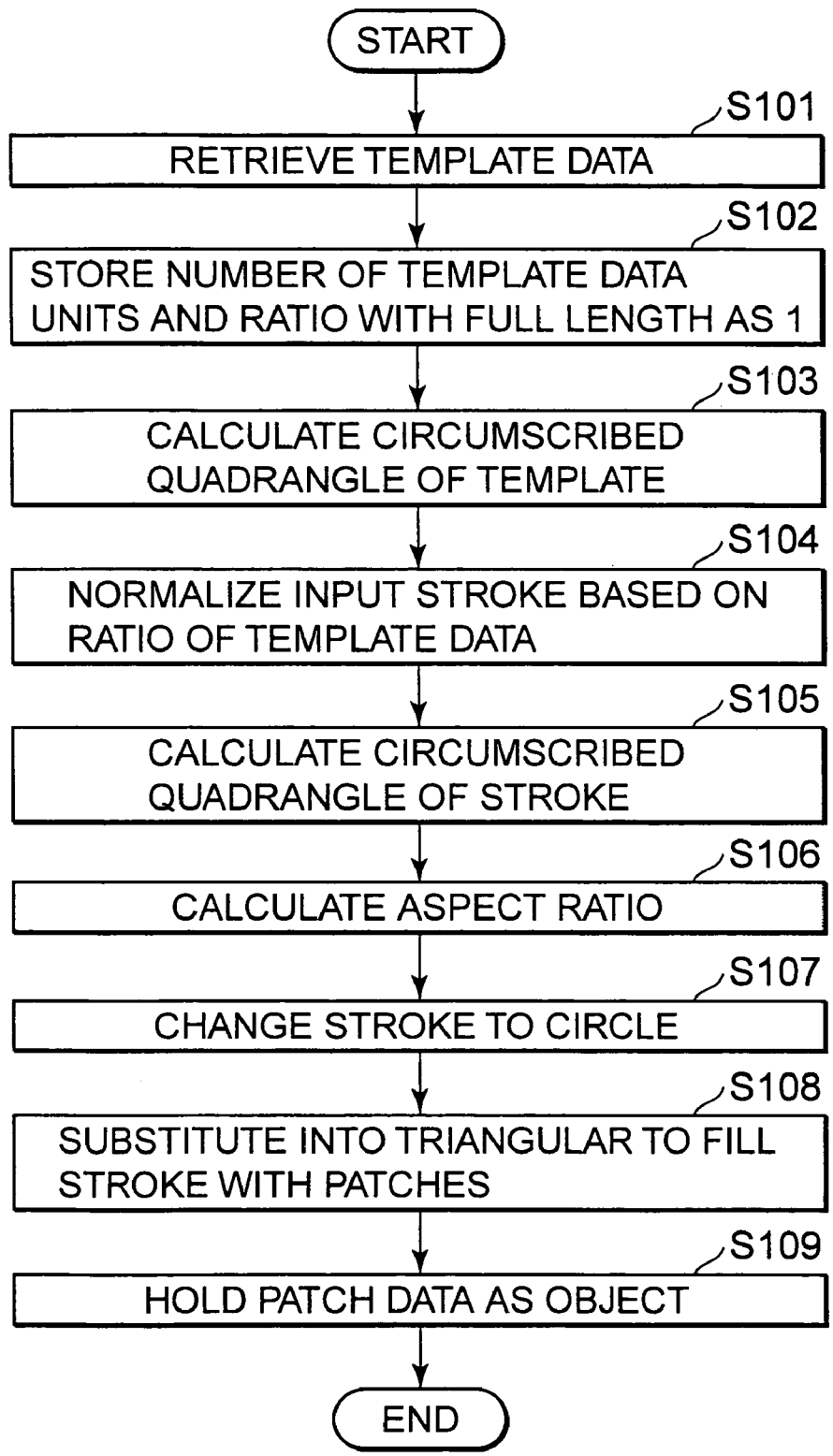
FIG. 4 is a flowchart showing the adaptation of a display object to an object arrangement area.

FIG. 2-FIG. 4 are flowcharts showing an example of the user interface method in this embodiment. More specifically, FIG. 2 shows a flowchart indicating a typical process flow, and FIG. 3 shows a flowchart which focuses on the user input events. In addition, FIG. 4 shows a more detailed flowchart for some steps in FIG. 2 and FIG. 3.

First, in step S1, whether the user has drawn a silhouette is detected. This step is executed, for example, by detecting whether the user has selected the silhouette drawing mode and has performed a predetermined drawing operation, such as an operation for drawing a closed curve. If the result is positive, control is passed to step S2; if the result is negative, step S1 is repeated as long as the silhouette drawing mode is selected.

In step S2, the silhouette area entered by the user is identified and the silhouette model is acquired. For a silhouette model that is a very simple model, such as a circle or a ball, the silhouette model itself need not be registered with the database but can also be acquired through calculation each time the silhouette is entered. On the other hand, for a complex model to be converted into a silhouette, it is possible to use a configuration in which the template data is registered with the database and, based on the recognition result of the user input, the silhouette template is searched for from the database.

In step S3, the stroke information is stored in a predetermined resource. The stroke information includes drawing data on the silhouette corresponding to the stroke as well as the parameters that will be used in the subsequent steps for conversion to a display object corresponding to the symbol. In step S4, the silhouette object is displayed.

Next, in step S5, whether the user has drawn a kanji character is detected. This step can be executed, for example, by detecting whether appropriate stroke information stored in step S3 exists, whether the kanji character drawing mode has been selected by the user, and whether a recognizable kanji character has been input into an appropriate input area through handwriting. The appropriate input area is an area within the displayed silhouette, an area prepared exclusively for symbol recognition, or a recognizable area on an input device such as a tablet. If the result is positive in step S5, control is passed to step S6; if the result is negative, control is passed to exception processing (this will be described later).

In step S6, a user-entered handwritten character is recognized by the system. Handwritten data entered by the user can be recognized through pattern matching using an existing OCR library and so on.

In step S7, the template database is searched based on the recognized character information. If an appropriate display object can be acquired from the database, it is determined that there is a display object in step S8 and the display object is acquired in step S9. If an appropriate display object cannot be acquired from the database, it is determined that there is no display object in step S8 and control is passed to exception processing (this will be described later).

In step S13, exception processing is performed. For example, a check is made if the system is waiting for a kanji character to be drawn. If the result is positive, control is returned to step S5 to allow the system to wait for the user to draw a kanji character. If the result is negative, control is passed to the start of the process.

In step S10, the display object is adapted to the shape of the silhouette. This adaptation is made in various ways, for example, by changing the shape of the display object, by changing the expression of a living thing display object, by adding shading to a texture display object, or by generating an appropriate audio effect, based on parameters such as vertical and horizontal scales, an area change rate, or an inclination determined by the comparison between the assumed silhouette shape and the actual silhouette stroke.

In step S11, information on the display object converted in step S10 is stored in the system and, in step S12, the display object is presented to the user at a right time in the system. Although the flow shown in FIG. 2 is terminated in any of several steps, this is the path to which control is passed, for example, when the application is terminated. A detailed description of this configuration is omitted because this is related to a change in the design.

FIG. 3 is a flowchart generated by rewriting the flowchart in FIG. 2 with the focus on the user input and, therefore, the same reference numerals are attached to the corresponding steps in FIG. 2 and the description is omitted.

FIG. 4 is a more detailed flowchart showing primarily the part S9-S11 in FIG. 2 and FIG. 3. In a configuration in which generation is performed based on the templates in a template database with which not only display objects but also silhouette data are registered, the processing in FIG. 4 can be applied similarly to the part S2-S3 in FIG. 2 and FIG. 3.

In step S101, template data is retrieved from the database.

In step S102, the number of template data units and the ratio calculated with the full length as 1 are stored.

In step S103, the circumscribed quadrangle of the template is calculated.

In step S104, the input stroke is normalized based on the ratio of the template data.

In step S105, the circumscribed quadrangle of the stroke is calculated.

In step S106, the aspect ratio is calculated.

In step S107, the stroke is changed to a circle.

In step S108, the circle data and the template data are substituted into Triangler to fill the stroke with patches.

In step S109, the patch data is held as an object.

Pseudo Code

FIG. 8-FIG. 17 show an example of a computer program in this embodiment in the form of pseudo source code. The contents are included herein.

Although the embodiments of the present invention have been described above using preferred examples, the present invention is not limited to these configuration examples.

For example, although a symbol and a silhouette are sketch-entered by a user in the example of the embodiment described above, the present invention is not limited to this configuration. For example, it is also possible to use a configuration in which a symbol and/or a silhouette is entered in a non-sketch way, for example, by reading a bar code or selecting from image data and only its editing (addition, correction, etc.) is done through sketch entry. In this case, the present invention allows the results of editing performed for a silhouette to be reflected on the behavior of a displayed symbol.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A user interface method comprising, using a processor to perform the steps of:
    acquiring a shape of an object arrangement area entered by a user's first sketch operation;
    acquiring an object conversion parameter based on the acquired shape of the object arrangement area;
    acquiring a symbol entered by a user's second sketch operation;
    searching registered objects for a display object associated with the acquired symbol;
    converting initial data of the display object to form a converted display object based on the object conversion parameter; and
    displaying the converted display object in the object arrangement area,
    whereby the size of the displayed converted display object is proportional to an area defined by the user's first sketch operation.

2. The user interface method according to claim 1, wherein the initial data includes initial shape data of the display object; and
    the converting step includes changing the shape of the display object from the initial shape.

3. The user interface method according to claim 1, wherein the object arrangement area has an initial set shape; and
    the object conversion parameter is acquired based on a comparison between the initial set shape and the acquired shape of the object arrangement area.

4. The user interface method according to claim 3, wherein the initial set shape of the object arrangement area is three-dimensional, and the acquired shape of the object arrangement area is two-dimensional, the method further comprising:
    converting the initial set shape into a two-dimensional projection, wherein the object conversion parameter is acquired based on a comparison between the two-dimensional projection of the initial set shape and acquired shape of the object arrangement area.

5. The user interface method according to claim 3, wherein the initial set shape of the object arrangement area is three-dimensional, and the acquired shape of the object arrangement area is two-dimensional, the method further comprising:
    extending the acquired shape of the object arrangement area into three dimensions, wherein the object conversion parameter is acquired based on a comparison between the acquired shape of the object arrangement area extended into three dimensions and the initial set shape of the object arrangement area.

6. The user interface method according to claim 1, wherein
the acquired symbol is selected from the group consisting of characters, character strings, and sentences; and
the display object associated with the acquired symbol is an image object related to a meaning of the acquired symbol.

7. A user interface apparatus, comprising:
means for acquiring a shape of an object arrangement area entered by a user's first sketch operation;
means for acquiring an object conversion parameter based on the acquired shape of the object arrangement area;
means for acquiring a symbol entered by a user's second sketch operation;
means for converting initial data of a display object to form a converted display object based on the object conversion parameter; and
means for displaying the converted display object in the object arrangement area,
whereby the size of the displayed converted display object is proportional to an area defined by the user's first sketch operation.

8. A computer-readable medium storing a computer program for causing a computer to perform a user interface process, the user interface process comprising the steps of:
acquiring a shape of an object arrangement area entered by a user's first sketch operation;
acquiring an object conversion parameter based on the acquired shape of the object arrangement area;
acquiring a symbol entered by a user's second sketch operation;
searching registered objects for a display object associated with the acquired symbol;
converting initial data of the display object to form a converted display object based on the object conversion parameter; and
displaying the converted display object in the object arrangement area,
whereby the size of the displayed converted display object is proportional to an area defined by the user's first sketch operation.

* * * * *

UNITED STATES PATENT AND TRADEMARK OFFICE
CERTIFICATE OF CORRECTION

PATENT NO. : 7,580,574 B2   Page 1 of 1
APPLICATION NO. : 10/863032
DATED : August 25, 2009
INVENTOR(S) : Hiroaki Tobita et al.

It is certified that error appears in the above-identified patent and that said Letters Patent is hereby corrected as shown below:

Column 2, line 13, delete "and";

Column 3, line 39, "objects," should read --objects--;

Column 3, line 53, "is," should read --is--;

Column 7, line 9, "require" should read --requiring--;

Column 10, line 59, "and" should read --and the--.

Signed and Sealed this

Ninth Day of November, 2010

David J. Kappos
*Director of the United States Patent and Trademark Office*